(12) United States Patent
Re et al.

(10) Patent No.: US 12,282,666 B2
(45) Date of Patent: Apr. 22, 2025

(54) SYSTEM AND METHOD FOR MAINFRAME APPLICATION ACCESS TO DATA STORED IN A NON-MAINFRAME ENVIRONMENT

(71) Applicant: VirtualZ Computing Corporation, Minneapolis, MN (US)

(72) Inventors: Vincent R. Re, Southport, NC (US); Jeanne M. Glass, White Bear Lake, MN (US); Marc S. Sokol, Palm Harbor, FL (US); Dustin W. Froyum, Golden Valley, MN (US)

(73) Assignee: VIRTUALZ COMPUTING CORPORATION, Minneapolis, MN (US)

( * ) Notice: Subject to any disclaimer, the term of this patent is extended or adjusted under 35 U.S.C. 154(b) by 188 days.

(21) Appl. No.: 17/957,030

(22) Filed: Sep. 30, 2022

(65) Prior Publication Data
US 2024/0111436 A1    Apr. 4, 2024

(51) Int. Cl.
*G06F 3/06* (2006.01)
(52) U.S. Cl.
CPC ............ *G06F 3/0622* (2013.01); *G06F 3/061* (2013.01); *G06F 3/0659* (2013.01); *G06F 3/0679* (2013.01)
(58) Field of Classification Search
CPC ...... G06F 3/0622; G06F 3/061; G06F 3/0659; G06F 3/0679; G06F 3/0604; G06F 3/067; G06F 3/0661; H04L 69/08
See application file for complete search history.

(56) References Cited

U.S. PATENT DOCUMENTS

| | | | | |
|---|---|---|---|---|
| 9,613,117 | B1* | 4/2017 | Meritt | G06F 16/196 |
| 2002/0013790 | A1* | 1/2002 | Vandersluis | G06F 40/151 |
| | | | | 715/239 |
| 2004/0044803 | A1* | 3/2004 | Mashima | G06F 3/0661 |
| | | | | 710/1 |
| 2005/0049849 | A1* | 3/2005 | Re | G06F 3/0664 |
| | | | | 703/26 |
| 2008/0208830 | A1* | 8/2008 | Lauckhart | G06F 16/332 |
| 2009/0199211 | A1* | 8/2009 | Chang | G06F 9/44505 |
| | | | | 719/317 |
| 2023/0089662 | A1* | 3/2023 | Wang | G06F 9/5072 |
| | | | | 707/827 |

* cited by examiner

*Primary Examiner* — Farley Abad
(74) *Attorney, Agent, or Firm* — Baker Botts L.L.P.

(57) ABSTRACT

A method includes receiving, at a storage client, an input/output (I/O) request from a mainframe application, the input/output (I/O) request being pursuant to a first protocol, the first protocol being a proprietary, mainframe protocol. The storage client may include a plurality of drivers, each driver being associated with a respective one of a plurality of data sources. A first one of the plurality of data sources that is suitable for addressing the I/O request is identified, it being configured to communicate using a second protocol, inconsistent with the first. Configuration data associated with the respective driver of the identified data source is accessed and used to convert the I/O request to a corresponding capability of the identified data source. The I/O request is executed on the identified data source, using the corresponding capability pursuant to the second protocol, and data is received from the identified data source, in response to the I/O request. The data may be communicated to the mainframe application in response to the I/O request.

16 Claims, 7 Drawing Sheets

SYSTEM AND METHOD FOR MAINFRAME APPLICATION ACCESS TO DATA STORED IN A NON-MAINFRAME ENVIRONMENT

BACKGROUND

The disclosure relates generally to mainframe operations, and more specifically to a system and method for data sharing between mainframe and non-mainframe resources.

BRIEF SUMMARY

According to one aspect of the present disclosure, a method includes receiving, at a storage client, an input/output (I/O) request from a mainframe application, the input/output (I/O) request being pursuant to a first protocol, the first protocol being a proprietary, mainframe protocol. The storage client may include a plurality of drivers, each driver being associated with a respective one of a plurality of data sources. A first one of the plurality of data sources that is suitable for addressing the I/O request is identified, it being configured to communicate using a second protocol, inconsistent with the first. Configuration data associated with the respective driver of the identified data source is accessed and used to convert the I/O request to a corresponding capability of the identified data source. The I/O request is executed on the identified data source, using the corresponding capability pursuant to the second protocol, and data is received from the identified data source, in response to the I/O request. The data may be communicated to the mainframe application in response to the I/O request.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
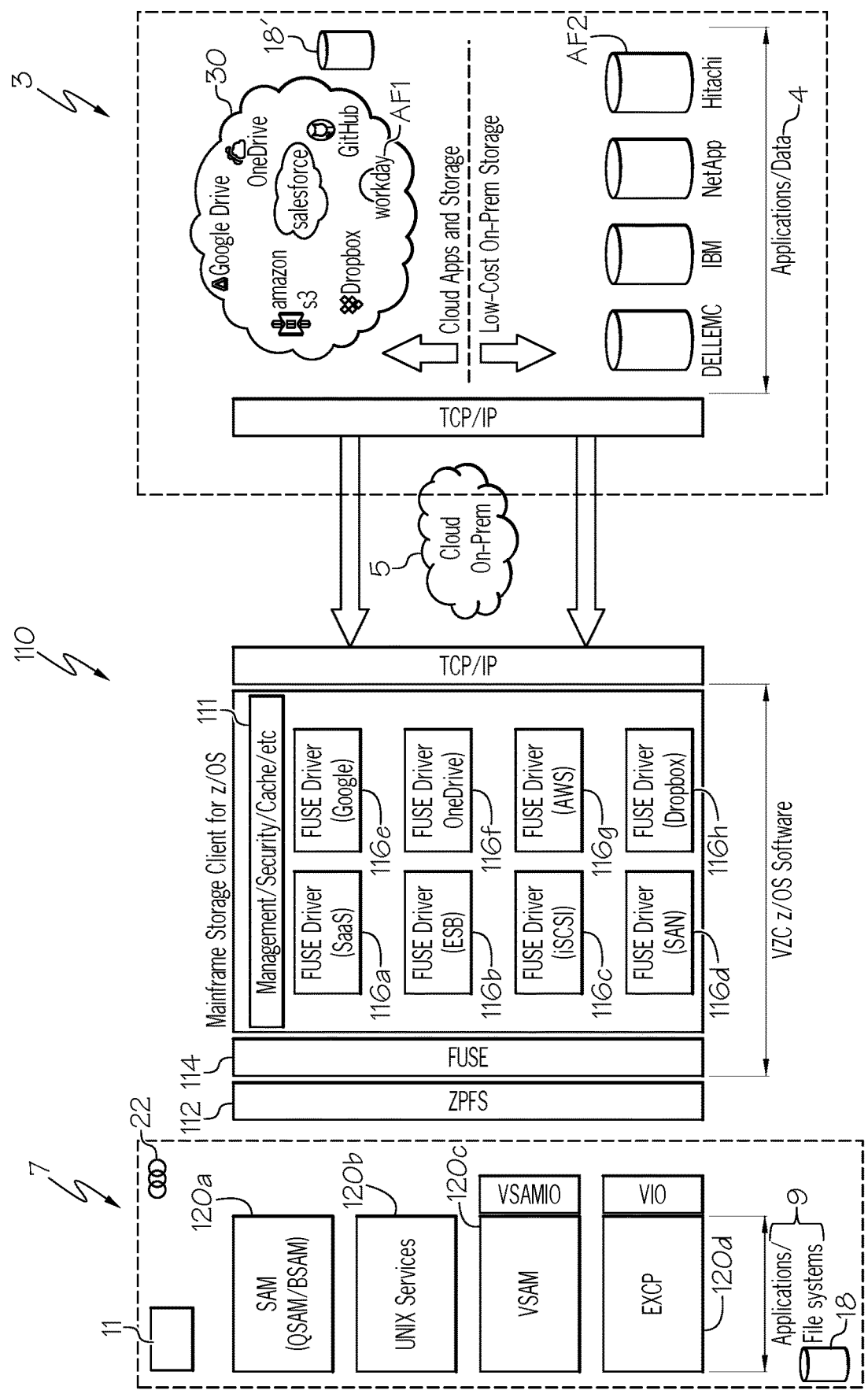
FIG. 1 illustrates a block diagram of a system for data sharing between mainframe and non-mainframe environments, in accordance with a particular non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Moreover, any functionality described herein may be accomplished using hardware only, software only, or a combination of hardware and software in any module, component or system described herein. Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including a symbolic programming language such as Assembler, an object oriented programming language, such as JAVA®, SCALA®, SMALLTALK®, EIFFEL®, JADE®, EMERALD®, C++, C #, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a cellular network, or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The teachings of the present disclosure relate to the selective interaction of resources from a mainframe environment to a non-mainframe environment. A non-mainframe environment refers to any computing resource(s) (hardware and/or software) that operate using an operating system that is not a mainframe operating system, for example, Windows®, Linux®, Unix®, and iOS®. In general, any mainframe environment employs a "proprietary" input/output (I/O) system, meaning that non-mainframe resources cannot gain access to or interact with mainframe resources since the I/O structure is not published or available to other computer resource providers. Non-mainframe resources, on the other hand, typically employ "open" and standards based-based client applications that allow non-mainframe resources to easily interact with each other. Thus, in accordance with a particular aspect of the present disclosure, a data sharing model is provided that allows proprietary I/O systems (e.g., mainframe resources) to be accessed by open and standards-based client applications (e.g., non-mainframe resources).

Many non-mainframe resources are utilized to build and operate public, private or hybrid cloud environments that leverage non-mainframe resources. For purposes of illustration throughout this description, reference is made to a "cloud environment." Such reference is intended to mean non-mainframe resources that operate as a public, private or hybrid cloud using non-mainframe resources. It should be recognized by those of ordinary skill in the art, that any non-mainframe computing resource(s) could be used in lieu of or in addition to the cloud environment discussed herein. The use of cloud environment is provided as one example, but it not intending to be limited to a "cloud" but instead could be replaced by or include any non-mainframe resources.

In accordance with another aspect of the present disclosure, a method is provided that allows for transactions executing on one platform to be transparently routed to another computer for execution, even where the "target" computer (computer that the transaction is being routed to) is of a different architecture or operating system. For example, a transaction executing on a mainframe platform transparently routed to a non-mainframe computer in order to access, copy and/or update stored data for execution during the transaction, or vice-versa.

Mainframes are powerful, multi-processor computers used primarily by large organizations for critical applications and bulk data processing, such as census, industry, consumer statistics, enterprise resource planning, and transaction processing. A mainframe computer is large but not as large as supercomputer and has more processing power than some other classes of computers, such as mini-computers, servers, workstations, and personal computers. Mainframe computers are often used as servers within an enterprise. The term mainframe is typically used to distinguish high-end commercial computers (i.e., mainframes) from less powerful machines.

Modern mainframe design is characterized less by raw computational speed and more by design that allows, inter alia: (i) redundant internal engineering resulting in high reliability and security; (ii) extensive input-output ("I/O") facilities with the ability to offload to separate engines; (iii) strict backward compatibility with older software; (iv) high hardware and computational utilization rates through virtualization to support workload isolation and massive throughput; and (v) the ability to dynamically and non-disruptively increase or decrease capacity (e.g., processors and memory or additional connected mainframes) as needs change.

Processing capacity of the mainframe computers is often measured in terms of millions of service units (MSUs) per hour that are used to execute tasks. Mainframe customers are often charged for their software application that runs on mainframe based on peak MSU consumption (i.e., the highest amount over a certain period of time, or a predetermined period of time (certain time of day(s), certain days, certain week(s), certain month(s), etc.)).

The high stability and reliability of a mainframe enables these machines to run uninterrupted for very long periods of time, with mean time between failures (MTBF) often measured in decades. Mainframes have high availability, one of the primary reasons for their longevity, since they are often used in applications where downtime would be costly or catastrophic. The term reliability, availability, and serviceability (RAS) is a defining characteristic of mainframe computers. In addition, mainframes are typically more secure than other computer types. For example, the National Institute of Standards and Technology vulnerabilities database rates traditional mainframes such as IBM Z (previously called z Systems, System z and zSeries), as among the most secure with vulnerabilities in the low single digits as compared with thousands for Windows®, UNIX®, and Linux®.

In general, mainframes are designed to handle very high volume input and output (I/O) and emphasize throughput computing. It is common in mainframes to deal with massive databases and files. Terabyte to Petabyte-size record files are not unusual in the mainframe environment. Compared to a typical PC, mainframes commonly have hundreds to thousands of times as much computer storage online, and can access it reasonably quickly.

Due to the complex and sophisticated nature of mainframes, they often require corresponding complex and sophisticated software in order to run properly and efficiently. Due to these complexities, mainframes are very expensive to purchase and maintain. Moreover, continued use of the software typically requires the payment of substantial fees either annually or on a per "use" basis. The per "use" basis may measure the number of transactions, the amount of resources used over a period of time and may also take into account the number of mainframes having a particular application installed thereon, or the number of applications on a particular mainframe.

Many enterprises rely upon mainframes for their ability to handle large datasets, and enterprise-critical applications that require the sheer power and reliability of the mainframe. An enterprise that relies upon mainframe computing typically employs one or more mainframe environments that each employ multiple applications running simultaneously, many or all of which rely upon at least one common dataset within the mainframe environment. Moreover, The idea of concurrency or sharing with integrity is important too . . . if multiple applications share a dataset, it's important that updates be handled in a consistent way so that the applications don't inadvertently "interfere" with one another. In accordance with the teachings of the present disclosure, access from any particular mainframe application(s) can be provided to non-mainframe storage resources in order to access, copy and/or update data stored on any one of multiple non-mainframe resources, with no loss of integrity.

Over time, the cost of computing resources outside of a mainframe environment has dropped dramatically to a point of widespread affordability, while the cost of computing resources and data storage inside the mainframe environment has decreased, but remains relatively expensive since its initial costs were astronomically high. In some cases, costs associated with running a mainframe have risen. Thus, there is a desire among many enterprises to reduce their reliance on mainframe resources, and leverage non-mainframe resources instead. Non-mainframe resources include computer resources and software that operate in an operating system that is not a mainframe operating system, for example, Windows®, Linux® and Unix®.

The widespread availability of alternative computing platforms and cloud computing resources provides attractive alternatives to solely relying on resources in a mainframe environment. In general, certain applications are best suited to the mainframe; others are best suited to other computing platforms (e.g., the cloud). Typically, customers have to pick one or the other for each application, and mainframe applications and cloud applications cannot talk to each other today. The teachings of the present disclosure allow a customer to put the application where it is best suited, because they can share data back and forth across applications and across platforms (e.g., mainframe vs. non-mainframe). This allows for a hybrid approach as opposed to one or the other alternatives. Enterprises are therefore motivated to move all but their most enterprise-critical applications and computing resources off of the mainframe, to less expensive computing resources. Transitioning from mainframe to cloud services, for example, allows enterprises to "modernize" their businesses, reduce costs and increase agility.

Applications running on the mainframe typically share access to data stored within the mainframe. For example, multiple applications running in an z/OS® environment employing virtual storage access method (VSAM) can share datasets within the mainframe environment among multiple applications. Those sharing applications can all be updating that same shared VSAM file, and the system coordinates these updates such that the applications don't interfere with each other or corrupt data. However, data in this environment lacks the structure of, for example, a typical database. Thus, it becomes difficult for an application running outside of the mainframe environment to "interact" with the mainframe environment by leveraging any applications within the mainframe environment or relying upon any datasets within the mainframe environment. Similarly, it is difficult for the mainframe to interact with an application(s) running in a non-mainframe environment, in order to leverage resources and/or stored data residing on such non-mainframe resources.

It also becomes difficult to remove an application(s) from the mainframe environment and relocate the application to another environment (e.g., cloud environments, Windows® operating system) without relocating the entire environment with all of its data, to the new environment. Another challenge is that the IO semantics of VSAM are very different from other environments. VSAM has primitives to search files by key, rewrite records in place, read files forward and backward and so on; these capabilities don't typically exist in non-mainframe environments.

The teachings of the present disclosure provide software and/or hardware that enable mainframe servers and systems to connect to many types of non-mainframe storage, ranging from cloud storage systems (e.g., Amazon S3®, Google Drive®, Microsoft OneDrive®, Dropbox®, Box® and many others) to low-cost hardware storage devices (e.g., those made available from Quantum, Netapp, Dell/EMC and others).

In accordance with particular embodiments, a mainframe software product is provided that is designed to run on a mainframe computer, for example, an IBM System Z mainframe computer running IBM's z/OS® operating system. In these particular embodiments, TCP/IP network connectivity is provided from the mainframe computer to any of the non-mainframe storage systems the user wants to access from their z/OS® applications.

In particular embodiments, mainframe applications are enabled to seamlessly access non-mainframe "data sources"-which may consist of an open-ended set of on-premises and/or remote filesystems, devices and services. For example, certain software may be deeply integrated with z/OS® JCL and data management constructs, enabling nearly any mainframe application to reference the above referenced data sources.

For example, particular embodiments leverage a robust installable device driver architecture that makes it easy to integrate arbitrary data sources with the mainframe software product including popular cloud storage systems like Amazon S3®, Google Drive®, Microsoft OneDrive®, Dropbox®, Box® and many others. The device driver architecture may be based on important open standards, making many implementations immediately available to users by simply reusing existing software.

The above mentioned device driver architecture may also support technologies such as the iSCSI standard, a popular protocol that enables high-performance and low-cost storage devices to be accessed over a TCP/IP network. This feature enables low-cost storage devices from a variety of vendors to be connected to mainframes and accessed by many mainframe applications.

The teachings herein may also enable cloud applications and SaaS services to be "consumed" by mainframe applications. In other words, applications running on a mainframe may be able to access, applications and/or data stored in non-mainframe environments. For example, the popular open-source GIT source code management system may be accessed by mainframe DevOps tools as an alternative to retaining source code and other artifacts solely on the mainframe.

In accordance with particular embodiments, the teachings herein provide for concurrent access to multiple data sources. For example, a mainframe software product may enable applications to access multiple data sources in parallel within a single application. Further, an application may be used to read records from Amazon S3® storage and write to Dropbox®, or any other mix of data sources.

In particular embodiments, bidirectional and automatic data transformation may be provided. For example, non-mainframe data (data stored in a non-mainframe environment) may be automatically transformed into a format that can be processed by mainframe applications, and vice-versa. For example, a mainframe software product in accordance with the teachings herein may enable a spreadsheet written by Microsoft Word and stored in Microsoft OneDrive to be directly processed by a mainframe application. In some embodiments, automatic data transformation enables the records of the spreadsheet to be transformed from UTF-8 text encoding to appear in a text format that's friendly (e.g., usable, readable, etc.) to most mainframe applications.

The teachings of the present disclosure may also provide for secure operation, including integrated authentication, authorization checking and data privacy enforcement. For example, a mainframe software product may work in conjunction with mainframe security software and policies to control exactly what data any user or application can reference. In parallel, the mainframe software product may also support the security protocols implemented by the storage provider, managing credentials, encryption and so forth as required. A site connecting to Amazon S3 storage, for instance, may use Amazon credentials to control the S3 storage resources a particular mainframe system is able to access, while mainframe security policies limit the resources any particular mainframe user can access.

In at least one embodiment, a VSAM emulation layer that enables mainframe storage client 110—managed data sources to be used as storage for mainframe VSAM files may be provided. In these embodiments, mainframe applications written to use IBM's VSAM capabilities (e.g., APIs) have the ability to place their data on a data source managed by the mainframe software of the present disclosure.

In other embodiments, a device emulation capability may enable the mainframe software product of the present disclosure to provide a device-specific interface to applications like tape devices. For example, certain mainframe applications (such as some popular backup/restore programs) perform low-level I/O in a device specific way that only operates with tape devices. Teachings provided herein enable such mainframe applications to communicate with practically any other mainframe application or non-mainframe application and/or storage device.

FIG. 1 illustrates a non-mainframe network environment 3 communicatively coupled with a mainframe environment 7, using a network 5. Mainframe environment 7 is a computer network environment comprising hardware and/or software supporting applications and filesystems operating and stored on it. In the illustrated embodiment, the mainframe environment is running the z/OS® operating system, but in alternative embodiments, mainframe environment 7 may be running other operating systems in addition to or in lieu of z/OS.

Applications and filesystems 9 comprise one or more applications and files organized according to the conventions of the mainframe environment 7, which often include proprietary formats. In the illustrated embodiment, z/OS® applications and files stored on mainframe storage devices are being accessed with VSAM and SAM (BSAM/QSAM/BPAM) access methods, although other methods are available. For example, the teachings of the present disclosure envision other operating systems, file storage media and access protocols as well, including SQL and non-SQL databases, hierarchical or network databases, and any other proprietary format.

Network 5 may be any combination of hardware and software that can be used to connect the client and server computer. In the illustrated embodiment, the TCP/IP network protocol is envisioned. Typically, the network layer includes a networkable file access protocol, such as some variant of NFS, SMB, or other common network file sharing protocols. Other protocols and devices can be used as well, such as SNA or NetBIOS networks, or hardware communications devices that provide a channel between client and server (such as two mainframes connected by channel-to-channel adapters, or two UNIX® computers connected by a serial port).

Non-mainframe network environment 3 may comprise any type of computer(s) and operating system(s) that can be connected to computers or servers over the designated network. In the illustrated embodiment, non-mainframe network environment 3 comprises computers based on Intel hardware platforms running Windows® or Linux® operating systems, both as stand-alone computers and as entities running in popular cloud environments. Any client computer capable of connecting to the server computer can be used, including mobile devices, IoT devices, smartphones, tablets, various architectures of servers, etc.

Applications/data 4 comprise applications and data that are software that may be written in any programming language that accesses data using standards-based I/O protocols. In the illustrated embodiment, client applications/data 4 may be developed using one or more programming languages including C/C++, Java and COBOL programming languages, and they access data using POSIX-defined file I/O APIs. The present disclosure also envisions other data access protocols and APIs, including common database products (such as JDBC/ODBC), so-called No-SQL protocols (as found in Hadoop, Cassandra, MongoDB and others), web service data APIs such as ODATA, and common proprietary APIs such as the BerkeleyDB indexed file API.

The teachings of the present disclosure provide systems and methods that enable applications/filesystems 9 of mainframe environment 7 to access data from the applications/data 4 of the client computer, even though the data on the client computer may be stored in incompatible and proprietary ways.

Such capability is provided even though there may be differences in data formats that impact the way data is stored and processed across non-mainframe network environment 3 and mainframe environment 7. An example may include a z/OS® VSAM file, commonly encoded in an EBCDIC codepage, versus a Windows® or Linux® application coded so as to expect data in an ASCII or UNICODE code page.

Using metadata describing the server's data layouts, the teachings of the present disclosure allow the system to automatically and in real-time transform between the native data structures found on the physical storage medium, to the formats expected by the client application. The transformation occurs at a field-by-field level and anticipates different character formats, number representation formats (ie, "big-endian" versus "little endian"), structure alignments and other complex transformations. Multiple different transformations can be in place concurrently if multiple applications access data from client computers having different data structure expectations.

Moreover, the teachings of the present disclosure enable concurrency such that multiple applications, whether running on one or many server computers within mainframe environment 7, can access the same applications/data 4 on non-mainframe network environment 3 with complete isolation and integrity. If Application/Filesystems "AF1" and "AF2" each update the same files, the teachings herein ensure that these updates are done with full integrity such that "AF1" and "AF2" can operate in parallel with no special coordination between the applications.

The teachings disclosed herein also provide an additional layer of security and management that occurs on the mainframe environment 7 and non-mainframe network environment 3, enabling administrators of the client computer(s) 3 to have control over the applications/filesystems (e.g., AF1 and AF2) that may access the system, the entitlements they may have, and whether their activity is audited. Such security and management may comprise applications resident upon and/or in communication with management/security application 111 of mainframe storage client 110.

FIG. 1 illustrates an architecture of software and hardware, in accordance with a particular embodiment of the present disclosure, to accomplish some or all of the features and functions described herein. In general, the architecture comprises three architectural components (i) a set of components 112 and 114 integrating a mainframe storage client 110 with existing mainframe applications 120*a*-*d* (e.g., z/OS® applications); (ii) the mainframe storage client 110 itself; (iii) drivers 116*a*-*h* (or "connectors") to various storage services that reside in a non-mainframe environment.

In the illustrated embodiment, mainframe storage client 110 comprises a z/OS® storage client meaning that is may reside on a mainframe server running on the z/OS® operating system. Thus, mainframe storage client 110 may be running on a mainframe server. However, mainframe storage client may also be configured to run on any computer and/or server outside of the mainframe environment (e.g., within non-mainframe environment 3). However, it should be appreciated that the mainframe storage client could reside on practically any mainframe server and/or non-mainframe server. The features and functions of the present disclosure may be accomplished upon a mainframe storage client that includes hardware and/or software resident upon a mainframe server, non-mainframe server, or distributed across both. The "storage client" may reside entirely outside of the mainframe environment, e.g., in a non-mainframe environment. Mainframe storage client 110 may include all software and hardware necessary to accomplish the features and functions described in the present disclosure. In other embodiments, some or all of such software and hardware may reside outside of the mainframe environment.

Together, these components provide the interfaces that enable mainframe applications/filesystems 9 to interface with mainframe storage client 110. In the illustrated embodiment, mainframe applications/filesystems 9 comprise existing z/OS® applications, that interface with a mainframe storage client running a z/OS® operating system. One goal of particular embodiments of the present disclosure is to provide seamless integration to existing applications while requiring no changes or proprietary APIs in order to integrate with such applications. Thus, this layer is designed to plug into the z/OS® operating system's filesystem design in a way that makes mainframe storage client 110 appear to the mainframe server and mainframe applications/filesystems 9 as any other mainframe filesystem would appear to the mainframe server and mainframe applications/filesystems 9.

There are four subcomponents present—the path any given application of applications/filesystem 9 takes to interface with targets such as non-mainframe applications/data 4 depends on how the mainframe application chooses to perform file I/O. Several examples will be provided below.
Traditional Sequential File Processing:

In particular embodiments, the teachings of the present disclosure define interfaces for sequential file processing to support applications based on IBM's QSAM or BSAM access methods. This category includes most traditional z/OS® applications that require sequential record processing, including COBOL, C, PLI, assembler language applications, system utilities and vendor software. These applications operate by invoking IBM's QSAM, BSAM or UNIX® services interfaces, which are extended by the teachings disclosed herein, to work with mainframe storage client 110. In particular embodiments, this can be accomplished, in part, using IBM's built-in support for z/OS UNIX® Services filesystems.

As one example, when an application accesses a SAM file, mainframe storage client 110 leverages built-in z/OS® operating system capabilities that work together to result in application I/O requests being passed to the mainframe storage client filesystem (described below). The flow is illustrated in FIG. 2.

Figure 2:
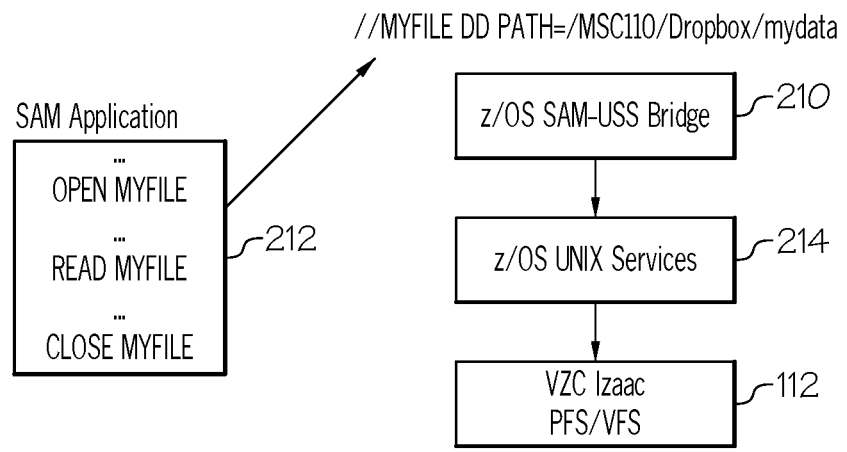
FIG. 2 illustrates block diagram of an I/O request transformation, in accordance with a particular non-limiting embodiment.

The z/OS® SAM-USS Bridge 210 shown in FIG. 2 is a z/OS® component (e.g., hardware and/or software) that maps QSAM and BSAM API calls 212 into equivalent UNIX® Services (USS) functions 214. This component allows applications to operate using normal QSAM and BSAM constructs, even though the underlying filesystem resources may be implemented as z/OS UNIX® Services resources. Mainframe storage client 110 leverages this component (e.g., PFS/VFS 112) to support legacy SAM and QSAM applications.
z/OS UNIX® Services Applications:

Applications that leverage IBM's z/OS UNIX® Services (USS) subsystem are conceptually very similar to the SAM applications described in the previous section. The teachings of the present disclosure define interfaces for sequential file processing to support applications based on IBM's QSAM or BSAM access methods. These applications may also access mainframe storage client 110 using IBM's built-in support for z/OS UNIX® Services filesystems, which may be supported by the teachings included herein, in particular embodiments.

Figure 3:
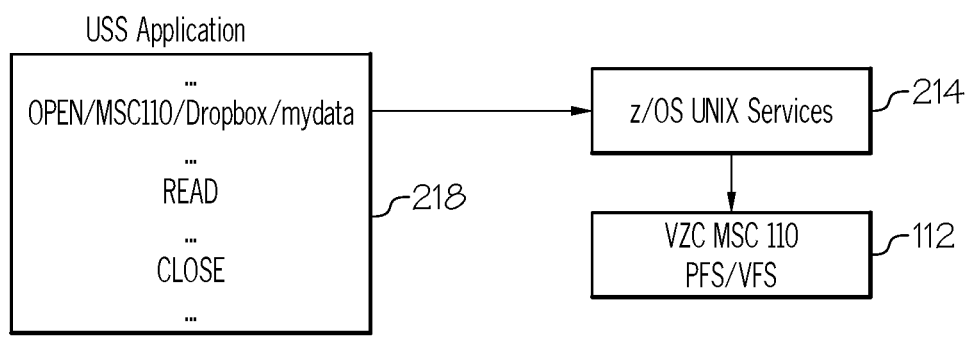
FIG. 3 illustrates block diagram of an I/O request transformation, in accordance with a particular non-limiting embodiment.

When an application accesses a z/OS UNIX® Services (e.g., USS Application file, the application communicates directly with the z/OS UNIX® Services kernel, bypassing the z/OS SAM-USS bridge shown in the previous section. The flow changes slightly from FIG. 2, to look like the diagram of FIG. 3.

By communicating more directly with mainframe storage client 110, applications can use a more comprehensive set of file I/O functions, such as positioning the file to different records, truncating files, creating directories and so forth.

Using the mainframe storage client 110 of the present invention, the mainframe application of mainframe applications/filesystems 9 is free to use the full set of POSIX I/O functions supported by z/OS®.

VSAM Applications:

Many mainframe applications are coded to use IBM's VSAM access method instead of QSAM, BSAM or UNIX® Services. VSAM provides many sophisticated functions, such as organizing records within a file by keys or providing access to records based on a relative record number. Applications needing to process records directly by key or record number typically would use VSAM.

Figure 4:
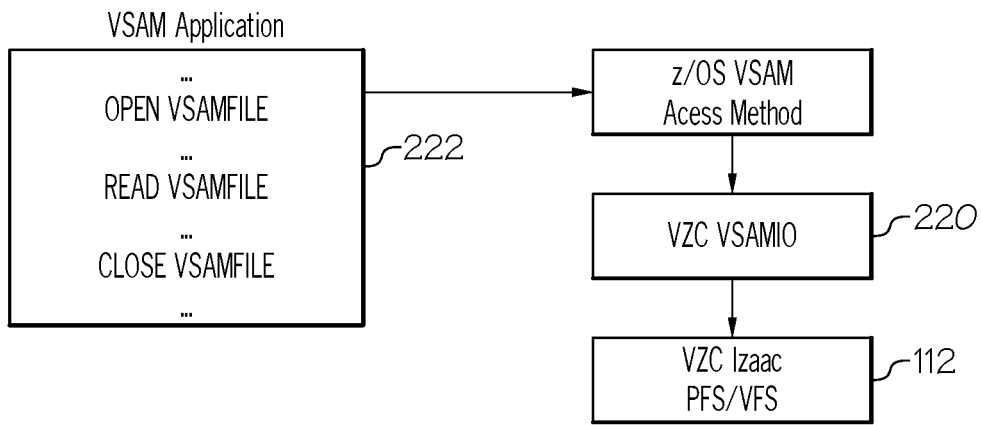
FIG. 4 illustrates block diagram of an I/O request transformation, in accordance with a particular non-limiting embodiment.

To support VSAM, the mainframe storage client 110 of the present disclosure includes the VSAMIO component 220 shown in FIG. 4.

With reference to FIG. 4, the VSAM application 222 operates unchanged in order to communication with mainframe storage client 110—the VSAM application 222 of mainframe applications/filesystems 9 uses the full set of VSAM API functions to process VSAM files in any manner it needs to or typically does, and these requests continue to communicate directly to the z/OS® VSAM access method routines.

Within VSAM is a "media manager" component that handles physical I/O to the storage devices holding VSAM objects. In particular embodiments of the present disclosure, mainframe storage client 110 intercepts and extends this system component such that requests managed by mainframe storage client 110 are automatically routed to the filesystem associated with mainframe storage client 110, for processing.

When a VSAM API request is issued, the processing still occurs in the normal manner, up through the time that the VSAM access method routines would perform I/O to the disk containing the necessary VSAM data. An VSAMIO intercept (e.g., VSAMIO 220) of the mainframe storage client 110 hooks into the process, taking over the responsibility for reading and writing the data blocks that VSAM requires. This approach allows low-cost storage devices and cloud storage providers to be used directly as though they were standard VSAM storage devices, potentially dramatically lowering operating cost for many applications.

Device-specific I/O emulation:

Some mainframe applications are coded to interact only with specific types of devices. Typically, these applications rely on a technique called channel programming—a technique for sending low-level device-specific commands to an I/O device. A common example are certain mainframe backup/restore applications that typically only write backup datasets to tape devices. Instead of using normal operating system functions to access tape files, these applications generate low-level I/O device commands that position the tape to the desired location and then efficiently transfer data to the tape device in large blocks.

In accordance with particular embodiments of the present disclosure, supporting device-specific applications with the mainframe storage client utilizes a virtualization of the target device (i.e., a non-mainframe application of non-mainframe applications/data 4) that's capable of acting as a "bridge" between the application and mainframe storage client 110. The non-mainframe application would believe it is operating against a traditional I/O device, then these special channel programs would be interpreted and processed by mainframe storage client 100, emulating the behavior of a physical device such as a tape drive. An example of such an architecture is reflected in FIG. 5.

Figure 5:
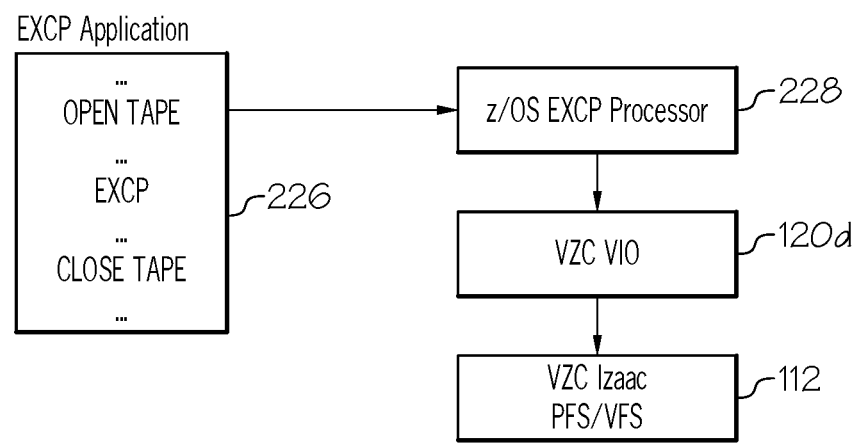
FIG. 5 illustrates block diagram of an I/O request transformation, in accordance with a particular non-limiting embodiment.

With reference to FIG. 5, the application 226 generates device-specific channel programs using EXCP (EXecute Channel Program), and these requests are processed by the z/OS® EXCP processor 228. Just as the description above regarding intercepting VSAM I/O requests to support VSAM, here, we intercept certain EXCP operations in order to provide a simulation of a standard mainframe I/O device (e.g., tape device). The channel program is decoded and transformed into a series of block reads and writes that are processed by the filesystem of the mainframe storage client 110.

Depending on the type of device being emulated, mainframe storage client 110 may access the application's channel program, decode the individual channel commands and transform them to a series of calls to the mainframe storage client 110. This technique permits any mainframe storage client 110 data source to emulate the desired device.

The Filesystem and Server of the Mainframe Storage Client:

At the center of the mainframe storage client 110 is the filesy stem and server. Together, these components form the visible manifestation of the mainframe storage client product.

Throughout this specification, the term "FUSE" is a reference to "Filesystems in USErspace", a popular open-source standard for implementing filesystems in a simplified manner.

Broadly speaking, the mainframe storage client 110 is an implementation of a z/OS UNIX® Services logical filesystem, as documented in z/OS® UNIX® System Services File System Interface Reference (IBM publication number SA23-2285). This standard provides a documented facility to integrate new logical filesystems into z/OS® by implementing a collection of well-defined programming interfaces. By following these conventions, z/OS® can be configured to allow Izaac to service Izaac filesystem requests on behalf of arbitrary z/OS® applications.

Figure 6:
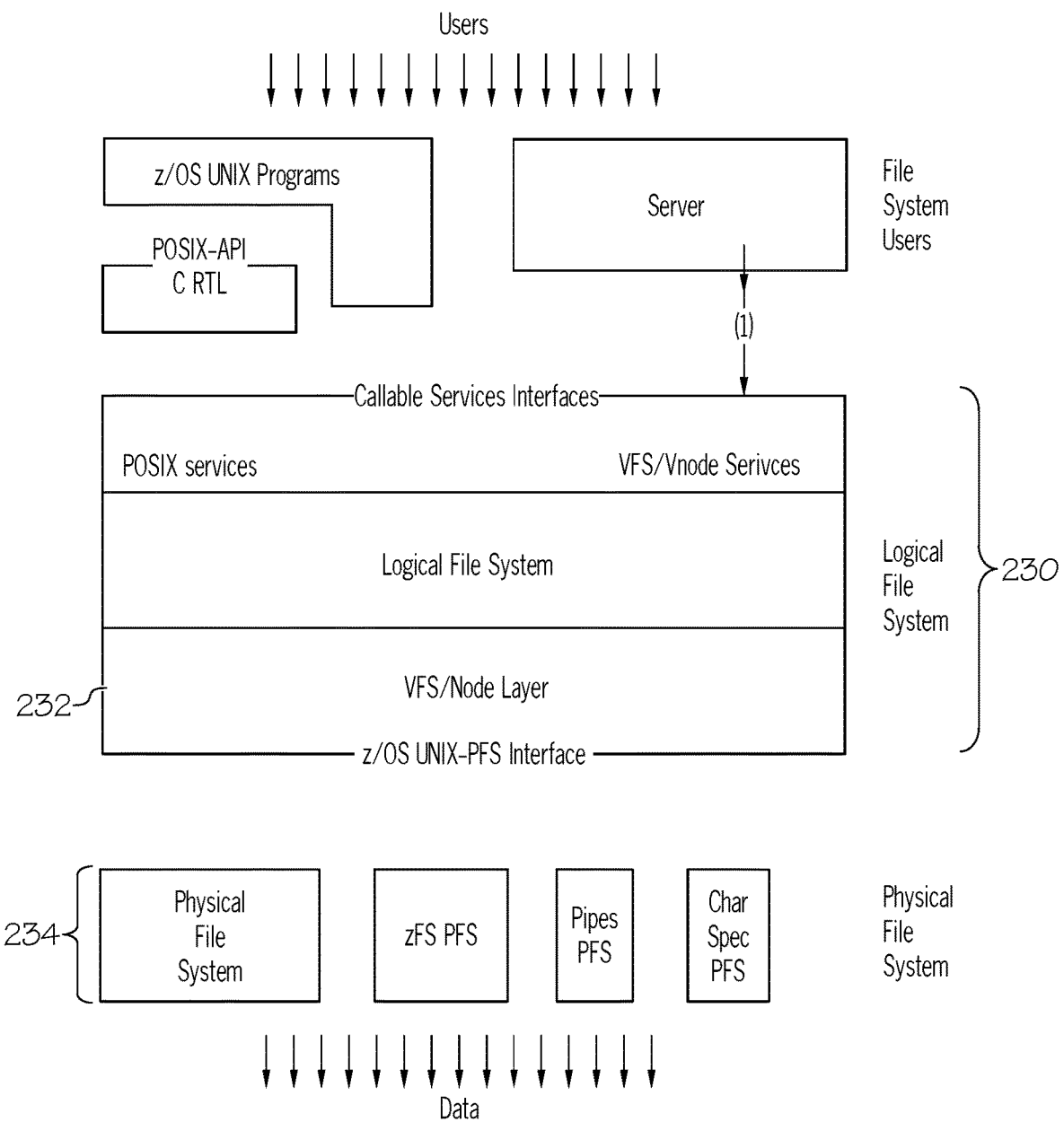
FIG. 6 illustrates block diagram of an I/O request transformation, in accordance with a particular non-limiting embodiment.

The overall logical filesystem design found in z/OS® is structured as illustrated in FIG. 6, a diagram provided by IBM.

In accordance with the diagram above, mainframe storage client 110 server process operates identically to other z/OS® logical file systems 230, processing messages and data requests from the operating system through the virtual file system (VFS) 232 and physical file system (PFS) 234 interfaces.

Unlike IBM's implementation, however, mainframe storage client 110 imposes a different structure at the lower part of the diagram of FIG. 6 to achieve data source independence and other important features. There are two goals:

1. Limit the need for highly proprietary z/OS® interfaces that require specialized engineering logic. Normally, the interfaces between z/OS® and logical filesystems is based on low-level mainframe capabilities, requiring considerable z/OS®-specific coding in the implementation of these functions. The teachings of the present disclosure provide an approach that minimizes the need for specialized mainframe interfaces and expertise to improve the cost and performance of the solution.

2. Allow standards-based filesystem drivers to be incorporated into mainframe storage client 110 with minimal changes. Mainframe storage client 110 is intended to support a wide variety of data sources, from cloud storage like Amazon S3®, Google Drive® or Microsoft OneDrive®, all the way to low-cost physical storage devices from Quantum®, Netapp®, Dell®/EMC® and others. To help mainframe storage client 110 achieve a broad range of supported services, the teachings of the present disclosure leverage existing technology in such a way that these device drivers can be shared from other computing platforms without requiring rewriting for z/OS®.

Figure 7:
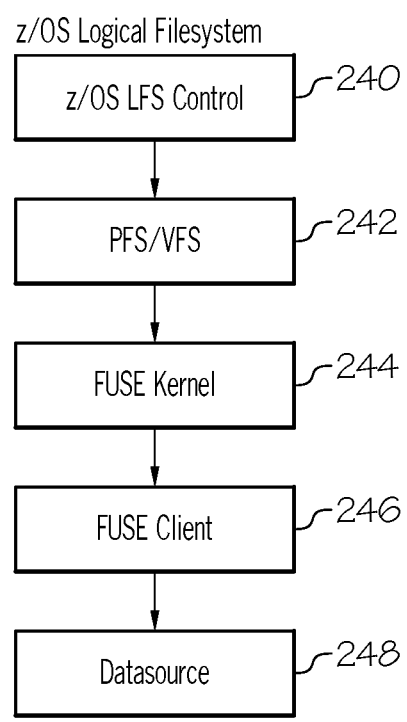
FIG. 7 illustrates a flowchart of a method for data sharing between mainframe and non-mainframe environments, in accordance with another particular non-limiting embodiment of the present disclosure.

In particular embodiments, the goals discussed above lead to a design where the logical filesystem implementation is divided into several subcomponents, as illustrated in FIG. 7.

With reference to FIG. 7, processing begins with the set of functions defined by IBM's z/OS® Logical File System control protocols 240. These functions largely correspond to filesystem activity: opening files, reading and writing data, and performing various file control functions. When triggered by applications performing file I/O against a non-mainframe data source managed by mainframe storage client 110, these functions are directed to a specific instance of mainframe storage client 110 that's been configured to handle requests for that filesystem.

The PFS/VFS layer 242 of mainframe storage client 110 is responsible for implementing the logical file system functions required by z/OS®, and then marshalling/unmarshalling requests for the FUSE layer of mainframe storage client 110

The PFS/VFS layer 242 of mainframe storage client 110 is also invoked directly under certain conditions, bypassing the z/OS® LFS component. Examples would include the VSAM VSAMIO or VIO device emulation capabilities explained earlier. Generally, however it's invoked, the PFS/VFS subcomponent 242 of mainframe storage client 110 maps the set of logical filesystem calls to the FUSE equivalents.

The FUSE Kernel 244 of mainframe storage client 110 is responsible for communicating requests between the PFS/VFS of mainframe storage client 110 and one or more FUSE applications (e.g., FUSE client 246). Each data source has one or more FUSE applications running as distinct processes outside of the FUSE Kernel of mainframe storage client 110. As filesystems are mounted and accessed, the FUSE Kernel 244 of mainframe storage client 110 launches, tracks and communicates with the FUSE application 246 that's been configured to support that specific data source instance.

Although certain configurations are described herein, persons of ordinary skill in the art will recognize that there are many configurations possible. Some users may elect to run a single instance of mainframe storage client 110 that is connected to multiple data sources. In other implementations, it may be desirable to have many instances of mainframe storage client 110 running on a particular z/OS® system, with each instance configured to connect to a different set of data sources. The optimum configuration varies depending on requirements for scalability, performance and security.

Configuration data provided to mainframe storage client 110 associates z/OS® filesystem mountpoints with the PFS/VFS server of mainframe storage client 110, and then with the specific data source drivers required for that mountpoint. For example, the user might define a mountpoint at "/MSC110" in their filesystem and associate it with the filesystem of mainframe storage client 110. Within that single mountpoint, the user might have several subdirectories representing different data sources with a structure like this:
/MSC110
  /MSC110/Google→Google Drive®
  /MSC110/Dropbox→Dropbox®
  /MSC110/Amazon→Amazon®
  /MSC110/SAN→DELL/EMC®

In the example layout above, an application referencing files in the /MSC110/Google directory would be referencing files in a Google Drive cloud repository, while files in the/MSC110/Amazon directory reference Amazon S3 files. This structure enables many different data sources to exist in parallel and to be accessed concurrently.

The FUSE client 246 is a distinct and separate process, running as a conventional unprivileged application on z/OS®. The linkage between the FUSE kernel 244 and the FUSE client 246 relies on a high-performance message-passing implementation. Messages generally correspond to the parameters passed to the z/OS® logical filesystem functions 240, sent by the FUSE kernel 244 to the appropriate FUSE client 246. The FUSE client 246 accepts these messages and communicates the request to the data source driver 248 (e.g., driver that corresponds to the source of the data of non-mainframe network environment 3; for example, the source of the data may be Dropbox® in a particular embodiment).

The FUSE client 246 presents information to the data source driver 248 using the protocol defined by the LIB-FUSE open-source protocol specification. This feature enables existing FUSE drivers that have been built for other platforms to be used with mainframe storage client 110 unchanged, greatly extending the reach of mainframe storage client 110.

The Datasource driver 248 of mainframe storage client 110 is an implementation of the FUSE standard driver as described in the link shown above. Mainframe storage client 110 adds several additional z/OS®-specific features to streamline development and operation. Among the services provided are z/OS® services, message queuing, data transformation, management alerting and so forth.

The FUSE Runtime Environment and Drivers:

FUSE data source device drivers of mainframe storage client 110 ("MSC110 Drivers") are the final link in the path between the application and the data source it seeks to process. Communicating according to the protocol required by the targeted cloud service or physical device, the MSC110 Driver encapsulates and manages all aspects of exchanging data with the targeted service.

MSC110 Drivers are implementations of the FUSE standard described earlier, and in most cases, mainframe storage client 110 can operate with preexisting FUSE drivers developed by the open-source community. This approach provides mainframe storage client 110 access to a wide variety of data sources, including Amazon S3®, Google Drive®, DropBox® and so forth. mainframe storage client 110 permits these and other FUSE drivers to be used concurrently in any combination.

Another example would be the use of FUSE drivers implementing the popular iSCSI standard, a low-level protocol for accessing physical storage devices and SAN services over a network. Using iSCSI, mainframe storage client 110 enables mainframe applications to be connected to many physical devices that previously had no direct connectivity to mainframes. This approach provides mainframe sites with high-performance access to low-cost storage devices.

The lifecycle of a driver of mainframe storage client 110 begins when the z/OS® system initially mounts the target data source. Based on configuration data, the user initiates a mount operation, specifying the target filesystem type and other parameters. z/OS® directs the request to the PFS/VFS of mainframe storage client 110 and mainframe storage client 110 in turn launches an instance of the FUSE Client of mainframe storage client 110 that loads and initializes the appropriate Driver of mainframe storage client 110 for that data source. In accordance with a non-limiting example of the present disclosure, the sequence is:

1. The PFS/VFS of mainframe storage client 110 is started by z/OS®. Typically, this happens during system startup as part of the initialization of the z/OS UNIX® Services system component.
2. Once initialized, the user can issue a "mount" command for a data source managed by mainframe storage client 110.
3. z/OS® communicates the mount command and other parameters to the PFS/VFS of mainframe storage client 110. Depending on configuration, there can be one PFS/VFS process of mainframe storage client 110 or several. When several PFS/VFS instances of mainframe storage client 110 exist, the mount command is passed to the appropriate instance.
4. The PFS/VFS of mainframe storage client 110 verifies the request and launches a new instance of the FUSE Client of mainframe storage client 110 to handle future access requests for the desired mountpoint. The FUSE Client of mainframe storage client 110 runs as a distinct process, separate from the PFS/VFS mainframe storage client 110.
5. The PFS/VFS mainframe storage client 110 periodically monitors the FUSE client for health, availability and status in order to cleanup automatically should errors occur.
6. The FUSE Client of mainframe storage client 110 loads and initializes the FUSE driver of mainframe storage client 110. Once initialization completes, mainframe storage client 110 is ready to accept I/O requests for the given data source.
7. As files within the data source are accessed, various messages are sent from the application through mainframe storage client 110 and into the FUSE Driver of mainframe storage client 110. The Driver processes these messages as required by the specifics of the data source it supports, reading and writing data as necessary.
8. At some point, it may be desirable to "unmount" the filesystem, terminating access to the data source. This is basically the reverse of the flow above: the FUSE driver of mainframe storage client 110 is sent a shutdown message and when it terminates, the FUSE client of mainframe storage client 110 terminates and the PFS/VFS of mainframe storage client 110 cleans up.

Internally, once launched, a Driver of mainframe storage client 110 begins operation by registering an array of "callbacks" with the FUSE runtime library (LIBFUSE). In this context, a callback is a subroutine provided by the driver that handles a specific type of event or operation, such as reading or writing a file.

LIBFUSE fetches messages queued for the driver from the PFS/VFS of mainframe storage client 110 and calls the appropriate driver-provided callback routine based on the type of message. In this manner, the Driver mainframe storage client 110 is notified to process I/O requests and control functions as required.

A typical Driver of mainframe storage client 110 encapsulates the protocol needed to communicate with a particular data source. A "generic" Driver of mainframe storage client 110 that operates against a cloud service like Amazon S3 may work like this:

1. During initialization, register an array of callback functions with LIBFUSE, guaranteeing that the driver will be able to process the specific filesystem events it needs. Once initialized, LIBFUSE is given control, waiting for incoming messages and dispatching them to callback functions within the driver as messages arrive.
2. Typically, the driver includes functions to handle requests to mount the data source. In a typical driver, this would involve establishing a network connection to the data source (an Amazon S3 or Google Drive server, for instance). Often, credentials are required at this stage, so the driver would authenticate itself to the data source server and establish whatever encryption protocols are required (if any). Authentication and encryption protocols vary by data source provider, and the driver is expected to contain the logic for working with whatever data source is has been designed for.
3. One set of driver functions exist to process filesystem metadata, such as listing objects by name or providing attributes of particular data source objects. These functions typically trigger data source specific APIs to retrieve information from the data source server. For example, Amazon®, Google® and Dropbox® all have different APIs to fetch metadata, and this logic would be encapsulated within the driver.
4. Another set of driver functions exist to handle data transfers, reading and writing data source objects as required. In addition to basic read and write functionality, most drivers include functions enabling file positioning (seeking), truncating files and so forth.
5. Another set of driver functions exist to perform control functions, such as deleting or renaming files, creating directories and so forth.
6. Another set of driver functions exist to handle termination and unmounting of the target data source. These functions clean up any network connections and other resources allocated by the driver and prepare for the PFS/VFS of mainframe storage client 110 to terminate the FUSE Client, the driver and any related resources.

In the case of physical storage devices connected via mainframe storage client 110, the approach generally follows the same flow as described above, except that most communication to the target device uses a single implementation of the iSCSI protocol. iSCSI is an industry standard defined by IETF RFC 3720 for communicating with storage devices over TCP/IP networks, and a single iSCSI FUSE driver can operate with storage devices from most vendors.

During operation, the FUSE Client of mainframe storage client 110 may override or supplement the processing normally performed by the mainframe storage client 110 Driver for the filesystem. An example would be applying data transformation policies to records as they are processed. Using data transformation policies defined to mainframe storage client 110, the FUSE Client can automatically transform records to and from any data source without specific code for transformations included in the Driver of mainframe storage client 110 itself.

Another example of functionality provided in the FUSE client of mainframe storage client 110 would be security processing. The FUSE Client of mainframe storage client 110 interfaces with the z/OS® system security component to ensure that customers can use mainframe security policies to control access to all data source objects in a consistent manner. This is done outside the Driver of mainframe storage client 110 so that there's no need to implement this logic in every driver.

The mainframe storage client 110 implementation of the FUSE protocol also provides an additional set of library routines to all Drivers of mainframe storage client 110.

These additional functions simplify access to several common z/OS®-specific technologies within Drivers of mainframe storage client 110:
1. Encryption technology.
2. Security and auditing.
3. Cache control.
4. z/OS® systems management functions, such as SMF recording.
5. Optimized networking functions.
6. Diagnostic aids.
7. Data transformation and character format translation Mainframe environment 7 may comprise an IBM mainframe computer 11, upon which some or all of the applications/filesystems 9 may reside. However, in particular embodiments, mainframe environment 7 may comprise multiple mainframe computers. Mainframe 11 may be an IBM zSeries mainframe such as IBM z14, IBM z13, or IBM z13s or another mainframe device, and may include an operating system. In alternative embodiments, it may include another type(s) of mainframe computer(s) The operating system may be an IBM z/OS® operating system or some other mainframe operating system. In a particular embodiment of the present disclosure, the mainframe computer may comprise a z/OS® 2.4 on an IBM zPDT, operating at approximately 7-9 MSU running one or more general-purpose CPUs and at least one ZiiP processor (z Integrated Information Processor).

Mainframe 11 may contain applications such as SAS 9.4m5, SAS IT Resources Management, Enterprise Cobol for z/OS®, Cobol V4, z/OS XL C/C++, Enterprise PL/I for z/OS®, CA Cleanup, CA Easytrieve Report Generator, CA Endevor Software Change Manager, CA Librarian, CA MICS Resource Management, CA Optimizer, CA Optimizer/II, CA Panvalet, IBM Compiler and Library for REXX and Developer for z Systems, or any other applications suitable to execute a task.

The primary distinguishing characteristic of a mainframe is the operating system that runs the environment. Some of the more popular mainframe operating systems include z/OS, z/VM, z/VSE, z/Transaction Processing Facility and Linux®. These mainframe operating systems are distinguished from the most popular non-mainframe operating systems such as Windows®, OS X®, iOS®, Android®, Linux®, Unix®. Other distinguishing characteristics of a mainframe environment include the file structure of the datasets and scalability (e.g., the ability to expand a single computer across a capacity range of over 1000:1 and to have tens of thousands of connected peripherals).

A mainframe environment is typically defined by a number of applications running on a mainframe operating system, with at least some and in some cases all of the applications sharing a particular dataset. In order to access the datasets, these applications rely upon at least one common file system and access method (VSAM, QSAM, BSAM, etc.) The mainframe environment of a particular enterprise typically refers to one or more mainframes, applications, shared storage, datasets and resources that comprise the environment leveraged by the enterprise. A particular mainframe environment may be defined by the mainframe resources behind a particular firewall set up by the enterprise. A mainframe environment may also be defined by a single, physical mainframe computer structure or the environment may include the resources within the organization (e.g., controlled by the organization, or behind the firewall of the organization).

The mainframe environment 7 of the present disclosure includes applications 120*a-d* being run by the enterprise. In a typical mainframe environment, many applications will run simultaneously. However, four applications (120*a-d*) are provided in FIG. 1 for illustrative purposes and to illustrate different types of applications and services.

Applications 120*a-d* rely upon dataset(s) 18 stored within the mainframe environment. The dataset(s) 18 may be arranged according to one or more of various data sets, including but not limited to a partitioned dataset (PDS), a portioned dataset extender (PDSE), VSAM key Sequenced Data Set (VSAM KSDS), VSAM Relative Record Data Set (VSAM RRDS), VSAM Entry-sequenced data set (VSAM ESDS), QSAM (Queued Sequential Access Method (QSAM), and/or UNIX® Services Filesystems.

Multiple applications of applications 120*a-d* typically share particular data of dataset(s) 18 stored within the mainframe environment. Thus, applications within the mainframe environment become reliant upon dataset(s) 18, and cannot easily be removed from the mainframe environment and/or moved to another mainframe environment without dataset(s) 18.

In certain embodiments, mainframe environment 7 may represent one or more SYSPLEXes. A SYSPLEX is a group of distinct instances (images) of the mainframe operating system (i.e., z/OS®). The mainframe operating system images could be running in separate physical computers, or they may be running in separate LPARs within a single computer, or they could be a combination of both. The z/OS® instances participating within a SYSPLEX communicate using variety of different specialized communication components and hardware (e.g., XCF).

Non-mainframe environment 3 may include any number of environments running various operating systems, for example Microsoft Windows®, Linux®, VMware Unix®. For example, cloud environments may comprise an Amazon Web Services, and/or Google Cloud environment. Cloud environment 30 includes enterprise business applications. In a typical cloud environment, many applications will run simultaneously.

The teachings of the present disclosure are intended to accommodate data sharing among the illustrated mainframe and cloud environments, even though the mainframe environment employs proprietary I/O systems. This allows for the proprietary I/O systems to access the "open" and "standards-based applications" of the cloud environment, and the "on premises storage applications (e.g., AF2).

Multiple applications within environment 30 may rely upon data 18' in operation. However, given that cloud environment 30 is a "cloud" environment, all of the resources of cloud environment 30, including its applications and data 18' may be distributed throughout the world in order to leverage the most cost effective, efficient and/or secure resources for accomplishing any given job, task, operation, workflow or transaction. A job is a separately executable unit of work and runs on the mainframe. This representation of a unit of work may consist of one task or multiple tasks. Each task may further consist of one step or multiple steps (transactions), where the execution of the step(s) may be required to complete a particular task of the multiple tasks.

In general, by "cloud" environment, it is meant to refer to the practice of using a network of remote servers (e.g., in some cases hosted on the internee) to store, manage, and process data, rather than a local server or a personal computer. In this manner, distributed resources around the globe (e.g., located outside of the firewall of the particular enterprise referred to above), may be leveraged to accomplish transactions previously intended for the mainframe environment.

As illustrated in FIG. 1, mainframe environment 7 may include one or more processors (CPUs) 22 capable of executing one or more executable instructions, and may also include one or more computer readable storage devices (e.g., memory) that may be volatile memory, non-volatile memory, or a combination of the two. Mainframe environment 7 may also include one or more input/output devices 26 (e.g., interfaces) to allow communication with other networks, such as network 5. The networks referenced herein may be Local Area Networks (LANs), Wireless Local Area Networks (WLANs), or a Wide Area Networks (WANs). Mainframe environment 7 may communicate with non-mainframe environment 3 using appropriate communication protocols (e.g., TCP/IP).

Figure 8:
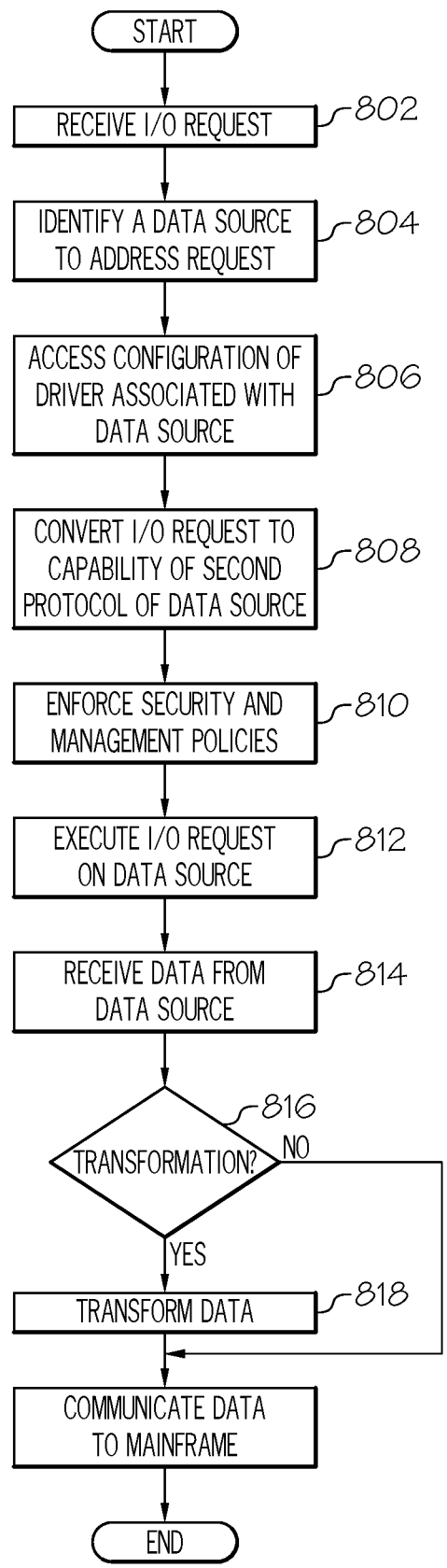
FIG. 8 illustrates a flowchart of a method for data sharing between mainframe and non-mainframe environments, in accordance with another particular non-limiting embodiment of the present disclosure

FIG. 8 illustrates a method 800 for executing an I/O Request in accordance with a particular embodiment of the present disclosure. The method begins at step 802 where an input/output (I/O) request is received at a storage client, from a mainframe application. The input/output (I/O) request may be received pursuant to a first protocol that is a proprietary, mainframe protocol. The storage client may include a plurality of drivers, each driver being associated with a respective one of a plurality of data sources.

At step 804 a first one of the plurality of data sources that is suitable for addressing the I/O request is identified. The first one of the plurality of data sources may be configured to communicate using a second protocol. Moreover, the second protocol may be a standards-based I/O protocol that is inconsistent with the first protocol. At step 806, configuration data associated with the respective driver of the identified data source is accessed. The configuration data may be specific to the particular data source and allow for communication with the particular data source to understand how to receive data and the format of the data.

At step 808, the I/O request is converted to a specific capability of the data source. The capability may be in accordance with the second protocol of the data source.

At step 810, security and management policies associated with the mainframe application may be enforced, using the storage client. Similarly, security and management policies associated with the identified data source may be enforced, using the storage client.

Next, at step 812, the I/O request is executed on the identified data source, using the corresponding capability pursuant to the second protocol. At step 814, data is received from the data source, in response to executing the I/O request on the identified data source.

In response to the I/O request, data is received from the identified data source, at step 814. At step 816 a determination is made whether the data received from the identified data source requires transformation in order to be consistent with the first protocol, or not. If the data does require transformation, the data is transformed at step 818. If the determination is made at step 816 that the data does not require transformation, the method continues to step 820, where the data (transformed if determined necessary, not transformed if not necessary) is communicated to the mainframe in response to the I/O request.

Most enterprises today (including approximately 8,000 mainframe customers) are looking to move their IT operations to the cloud for cost savings and to enable the modernization of their IT infrastructure, and to allow for growth. However, given most technology available today, converting from mainframe environment 10 to cloud environment 30 for even a moderately sized enterprise is a high-risk, high-dollar endeavor that may take large teams of people multiple years to accomplish. When a network of inter-connected applications and data can be spun-off and moved to the cloud one at a time, tracking their dependencies can be daunting, and it may turn out to be too entangled to proceed with a safe migration. The risk involved is loss of data, loss of functionality of the cloud environment or services it provides, crashing of applications, inoperability of applications within the environment or corruption of data. Since enterprises that have access to mainframe environments typically put the most critical functions in the mainframe environment, the culmination of any such risks can be devastating to the enterprise.

As an example of the time, cost and complexity of such an effort, Amazon Web Services published an example of the manner in which the New York Times accomplished mainframe to AWS cloud migration, in a blog in May 2019. The process involved an eight step process that occurred over a period of five years, in order to transform a single legacy COBOL-based application into a modern Java-based application.

Figure 9:
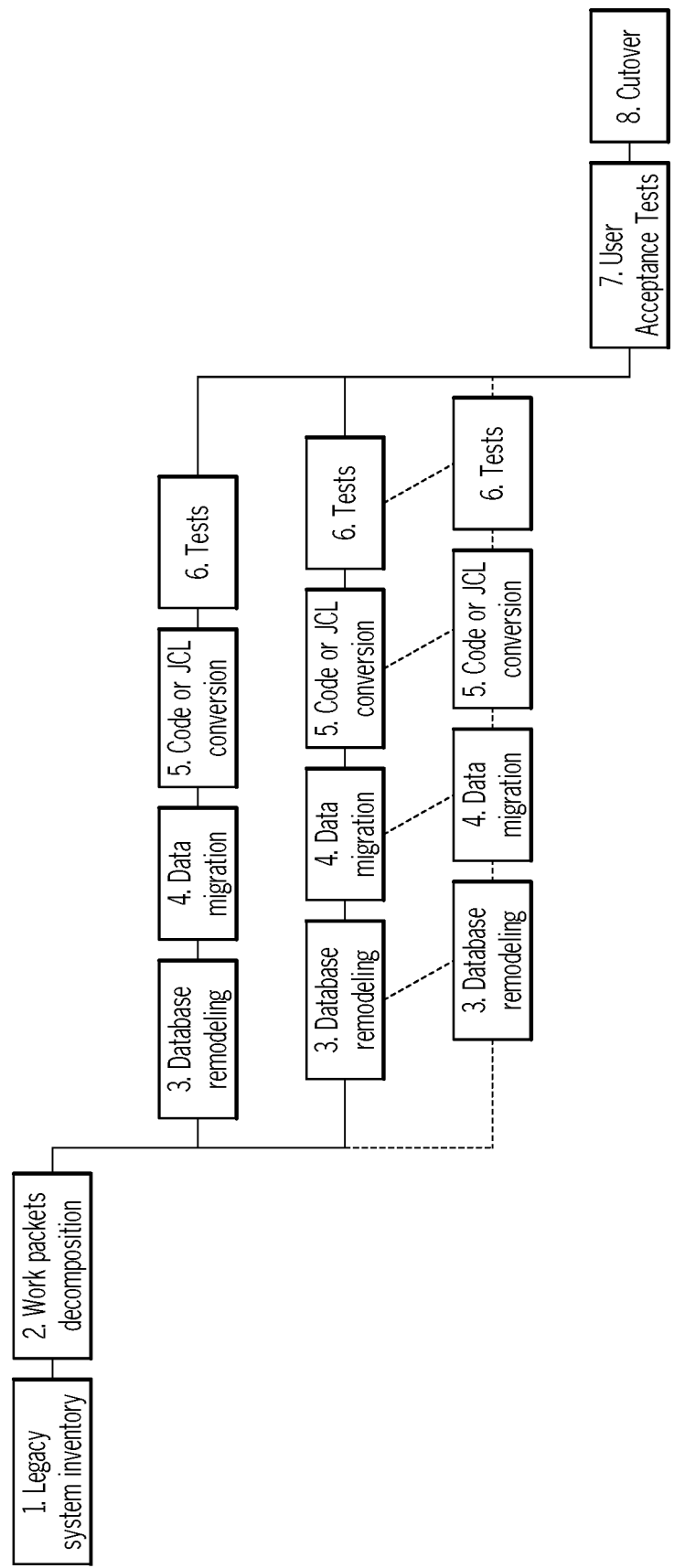
FIG. 9 illustrates a flowchart excerpted from a blog post.

The process is illustrated in FIG. 9 and described below (excerpted from the above referenced blog post):

Step 1 performs an automated inventory of the mainframe and populates a repository of components to be migrated. Step 2 consists of a detailed analysis of the applications, data model, architecture preferences, coding styles, database connections, error handling, and refactoring options. All of this leads to the definition of how to piecemeal the code transformation with work packets and the overall test strategy. In Step 3, for each work packet, the data model is defined and created in the target database. Step 4 automatically generates programs and processes for unloading, transforming, validating, and loading of data from the source data store to the target database. In Step 5, Modern Systems' CTU is used to reverse-engineer the COBOL code into an intermediate language, and then to forward-engineer the target Java code. Step 6 performs regression tests for each work packet, making sure there is functional equivalence between the source mainframe programs and the new Java code. Step 7 is the user acceptance test execution code process. In Step 8, once these tests are successful, the cutover to production takes place.

Whether the goal of an organization is to convert entirely from the mainframe environment to the cloud environment, or only convert certain applications, features, functions, workloads, etc (e.g., data storage) to the cloud based environment, the teachings of the present disclosure allow this to be accomplished in a way that avoids the time, expense and risk of an all or nothing approach. Such teachings also allow for the migration of one or more features or functions (e.g., data storage) in much less time, and with much less risk, by allowing the mainframe environment and the cloud environment to run simultaneously, relying upon and continuously updating a common data among the mainframe environment and the cloud environment.

For example, any particular large airline may never want to move its ticketing system to the cloud, since ticketing systems of large airlines may always require the power of a mainframe. So given today's technology, such an airline would not be candidate for mainframe to cloud migration for any of its computing resources. However, given the teachings of the present disclosure, such an airline could leave its ticketing system on the mainframe, but migrate other features or functions (e.g., data storage) that are interconnected with the ticketing system to a cloud environment in order to see significant cost savings.

Each of computer or server referenced herein may include one or more processors (CPUs) capable of executing one or more executable instructions, as well as one or more computer readable storage devices (e.g., memory) that may be volatile memory, non-volatile memory, or a combination of the two. Each may also include one or more input/output devices and/or interfaces.

In accordance with particular embodiments, any access to the mainframe environment 7 may be done in a secure manner. For example, it may be possible to specify a security identity when attaching a mainframe file share to a remote system, and then all z/OS® file access for that share will reference that particular user. Thus, security checking will leverage the customer's security product (e.g., CA ACF2, CA Top Secret, or IBM RACF) and any other mainframe security policies that the enterprise defines.

In alternative embodiments, remote access may trigger "normal" mainframe management instrumentation, meaning that files can be automatically archived/recalled, audited, monitored for performance, etc.

In accordance with particular embodiments, network flows may follow industry-standard network file sharing protocols (e.g., NFS V4), with the benefit that little to no data-sharing software will be required on the "client" side (i.e., the cloud environment) when accessing basic mainframe data. Basic access to mainframe data may be configured to work from any system having an appropriate NFS client, including Windows®, Linux® and other platforms.

Thus, the teachings of the present disclosure can be used to make a broad collection of datasets of the non-mainframe environment 3 accessible from applications running in a mainframe environment, and vice versa (e.g., datasets of a mainframe environment accessible by the cloud environment, including sequential (QSAM/BSAM), partitioned (PDS/PDSE) and VSAM datasets. Moreover, the teachings of the present disclosure include the ability to randomly process records within a VSAM dataset (e.g., search a VSAM file for a record matching a particular key or relative record number, and then read just that single record). The teachings will also include the ability to access those records sequentially (for example, if a keyed VSAM KSDS is accessed, read the dataset in sequential order—i.e., order of ascending keys since the file is a VSAM KSDS).

The teachings of the present disclosure provide advanced capabilities for data sharing among mainframe and non-mainframe environments. Some of these capabilities are set forth below:

Navigate files in multiple directions (forward to backward, or backward to forward).
Read records by record number ("get the 423rd record").
Insert records anywhere in a file without rewriting it.
Delete records from anywhere in a file without rewriting it.
Update (re-write) individual records in place.
Perform updates or so-called "repeatable reads" with transactional integrity.
Process so-called alternate indexes where multiple search keys may be available for a given search argument.
Create files containing data to be printed on the target system.
Alter the structure of existing files, or create new files in proprietary formats.
Obtain comprehensive metadata for files on the server.
Participate in single- or multi-resource transactions, including the ability to COMMIT or ROLLBACK changes.

TRANSACTIONAL VIRTUALIZATION

Transactional virtualization is discussed in detail in U.S. patent application Ser. No. 16/680,963 and entitled "System and Method for Enhancing the Efficiency of Mainframe Operations," which is hereby incorporated by reference. Consistent with the teachings of the present disclosure, it is clear that the target of any transactional virtualization can be anywhere, including to platforms different from the originating source platform. However, a more robust definition of the target execution environment is required. For example, if a mainframe binary executable is taken to a Windows® computer, an interpretive layer needs to be in place so that the mainframe executable can somehow be run on a computing architecture that's not native to it. At the other end of the spectrum, a Java program can generally run anywhere—there's no need for an extra layer of interpretation or emulation there. Thus, the approach to implement the teachings of the present disclosure will vary, depending on the nature of the application involved and the differences between the original source and the target.

Organizations' valuable data is stored in a variety of ways today: in the cloud, on SAN devices, or in SaaS applications, to name a few. The mainframe has not really participated in this approach. However, the teachings of the present invention includes features and functions that allow a mainframe storage client ("MSC"), as described above, to expand the participation of the mainframe in data storage. For example, in particular embodiments, the MSC operates under a concept of "IBM Z as the client." This approach "elevates" the mainframe so that it has the same capabilities as other platforms when it comes to accessing data.

For example, applications running on IBM Z can get real-time, read-write access to data on storage platforms such as Amazon S3® and/or created by applications running in the cloud or on distributed platforms (GitHub or Salesforce.com, for example). MSC makes a broad universe of data sources newly available to mainframe applications that can consume that data any in any way it chooses—without losing any of the mainframe's classic strengths, like security and policies.

Use cases of particular embodiments of the present disclosure are discussed below, and are intended to be non-limiting, but illustrative of various embodiments.

Cloud/Distributed Applications:

There are many use cases for enabling mainframe applications to access data from cloud and distributed applications. MSC may allow this to be done directly and without intermediaries or extra manual effort.

A user has a COBOL business application running on z/OS® that needs to read and write data in the Amazon S3® cloud. With MSC, a JCL change allows for that.
A user is generating data in a SaaS application like Workday that they need to process in their mainframe application. With MSC, it is simple and straightforward to configure for that.
A user is using GitHub® as their enterprise source code repository, but they tend to have different solutions for their mainframe code, because it is not as easy to connect to GitHub®. They are likely to still be using some legacy source code management system, like Panvalet or Librarian. With MSC, they can create a direct connection to GitHub®. All those files then look just like local files to their z/OS® applications. For example, mainframe applications which are compiling various programs that need access to the corporate source code libraries can directly do that against sources like GitHub®, without having an ETL type process or the need to move that data back and forth.

Connected Storage

There are many valuable use cases for enabling mainframe applications to access data from connected storage devices.

One of the core use cases for MSC is connecting the mainframe to a whole family of storage devices using the iSCSI protocol (or any network protocol). Users may find it advantageous to use lower-cost, high-performance storage from vendors like NetApp, Quantum, Dell, and others.

With MSC, a user can access file systems on any type of device through network protocols like iSCSI and others. This gives mainframe users entirely new options for the type of devices they can connect to their mainframe.

Access Multiple Data Sources Concurrently

MSC enables applications to access multiple data sources in parallel within a single application. Here are a few examples:

An application reads records from Amazon S3® storage and writes to Dropbox®.

A user can write a file to OneDrive® and archive a copy of that same data in Azure.

A user can do both of those concurrently within a single application, with a broad mix of data sources.

Historically, the most common way for mainframe applications to consume non-mainframe data is through custom code. This approach can be expensive, time consuming, error prone, and requires ongoing maintenance. For example, a user might write specific software to connect their mainframe application to storage platforms like Dropbox or Amazon S3. This is less than optimal for several reasons: (i) it might not be a lot of code, but it can be complicated and expensive to maintain over time. (ii) most large organizations will need to create many instances of this—they might have Dropbox and Amazon S3, or they might have OneDrive and Google Drive, and they will need to write and maintain code for each. Further, the only applications that they can really connect this way are going to be custom applications that are coded to read and write data from the possibly multiple target data sources. Finally, storage platforms are changing all the time, so the code written three years ago to access files in Amazon S3, for example, likely won't work the same way today.

There are related technologies like JDBC. A user can have a JDBC application running on z/OS® that connects to Microsoft SQL server (or any database running on any platform that has a JDBC implementation available for it). But it is a small universe of applications that fit that scenario. Hardware devices are another possibility. Lower-cost storage devices can be connected to the mainframe using a hardware solution that talks iSCSI protocols or FCP protocols and can connect to a mainframe IO channel, so the device looks like a mainframe device.

The approach of the MSC of the present disclosure is very different. It allows for multiple data sources and does it in a way that can be zero new code, where any application that can reference local files can work against the cloud (including applications that are connecting to local, low-cost storage devices residing in the customer's own data center).

Built on Open Standards

At its lower levels, MSC is based on open source and industry standards. It includes a robust installable device driver architecture that makes it easy to integrate a multitude of data sources with MSC, including popular cloud storage systems like Amazon S3®, Google Drive®, Microsoft OneDrive®, Dropbox®, and many others. The device driver architecture is based on open standards, making many implementations immediately available to MSC users by simply reusing existing software. The MSC leverages proven, existing device drivers that are in common use on other platforms (versus building our own) and run them on z/OS®. As an example, Windows® users often have more devices they plug into their Windows® computers than Linux users do. With MSC's standards-based approach, the Linux® user can use anything that is been developed for the Microsoft® world on their platform.

iSCSI Support

MSC's device driver architecture also supports technologies such as the iSCSI standard—a popular protocol that enables high-performance, low-cost storage devices to be accessed over a TCP/IP network. Built-in support for the iSCSI standard enables storage devices from a variety of vendors (NetApp® or Dell®, for example) to easily be connected to mainframes and accessed by many mainframe applications. The iSCSI protocol is very high performance. It is universally supported across a wide range of hardware devices, giving MSC the ability to connect to SANs and all sorts of different devices from z/OS®. Additionally, because iSCSI is a network protocol, the only hardware a user needs is a TCP/IP network connection. There is nothing physically that you are connecting to a mainframe channel. It is accomplished over a network channel.

Support for Cloud and SaaS

With MSC, cloud applications and SaaS services can be consumed by mainframe applications. The popular open-source GIT source code management system, for example, can be accessed by mainframe DevOps tools as an alternative to retaining source code and other artifacts solely on the mainframe. In this example, MSC is not just reading and writing discs in GitHub; it is communicating with the GitHub service, providing access to the underlying data and then making that appear like ordinary files to the mainframe applications. This same concept applies to a broad range of cloud and Saas offerings, including Workday, Salesforce-.com, email systems, and many others.

Concurrent Data Access

With MSC, a single application can access multiple data sources concurrently. For example, an application can be used to read records from Amazon S3® storage, write to Dropbox®, and write copies to Azure. This opens a whole range of new ideas for things like fault tolerance. For example, instead of writing data only to Amazon S3®, a user can write copies to Google Drive®, OneDrive®, and Azure. The cost of these storage systems is so low that the user can afford to do that and still save money (versus keeping it stored on the mainframe). This provides the added flexibility to make decisions practically in real-time, on the fly for cost and performance reasons. For example, if an application needs to create a hundred terabytes of information on a given day, where is the cheapest place to put that? One day the cheapest place to put that could be Azure, while the next it might be Amazon® and the day after it might be Google®. With MSC, a user can adapt and adjust your targets (storage applications) based on cost and performance.

Bidirectional and Automatic Data Transformation

One of the built-in capabilities in MSC is that data can be transformed bidirectionally (incoming and outgoing). Non-mainframe data can automatically be transformed into a format that can be processed by mainframe applications and vice versa. For example, MSC enables an Excel spreadsheet stored in OneDrive to be directly processed by a mainframe application. Automatic data transformation enables the records of that spreadsheet to be transformed from UTF-8 text encoding to a text format that is readable to most mainframe applications. Another example is a large, Complicated mainframe data record that is transformed to a CSV file that can be processed in Microsoft Excel. This transformation happens dynamically and with great flexibility. If a user has two different applications running on a mainframe, one application can see data transformed a certain way, while the other application sees the same data transformed completely differently.

Security

MSC works in conjunction with mainframe security software and policies to control exactly what data any user or application can reference, providing integrated authentication, authorization checking, data privacy enforcement, and auditing support. In parallel, MSC also supports the security protocols implemented by the storage provider, managing credentials, encryption and so forth as required. As an example, a site connecting to Amazon S3 would use Amazon credentials to control what Amazon S3 storage resources a particular mainframe system is able to access, while mainframe security policies limit the resources a particular mainframe user can access. With the "IBM Z as a client" approach described above, mainframes are potentially going to be talking to a lot of different cloud data sources, and each of those might have a lot of different user accounts. MSC lets you manage those different client connections at the same time, using different credentials on each of them. You decide what credentials you want to use when connecting to the cloud data source, and then you use mainframe style security policies to control who can access that.

Data Integrity

Data integrity varies depending on the capabilities of the cloud provider. Many cloud providers implement systems where it is essentially a single application at a time. Amazon S3, for instance, can have policies where a user can have as many readers as you want, but only one application can write the file at a time. This ensures integrity by guaranteeing you cannot have multiple updaters against the file running in parallel. If you use MSC in a model that allows for "multiple readers, single writer," those are the rules MSC implements and follows.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:

receiving, at a storage client, an input/output (I/O) request from a mainframe application, the input/output (I/O) request being pursuant to a first protocol, the first protocol being a proprietary, mainframe protocol;

wherein, the storage client includes a plurality of drivers, each driver being associated with a respective one of a plurality of data sources;

identifying a first one of the plurality of data sources that is suitable for addressing the I/O request, the first one of the plurality of data sources being configured to communicate using a second protocol, the second protocol being a standards-based I/O protocol that is inconsistent with the first protocol;

accessing configuration data associated with the respective driver of the identified data source;

using the configuration data to convert the I/O request pursuant to the first protocol to a corresponding capability of the identified data source pursuant to the second protocol;

enforcing, using the storage client, security and management policies associated with the mainframe application and security and management policies associated with the identified data source;

executing the I/O request on the identified data source, using the corresponding capability pursuant to the second protocol;

receiving data from the identified data source, in response to the I/O request;

determining whether the data received from the identified data source requires transformation in order to be consistent with the first protocol;

in response to determining that the data requires transformation, transforming the data received from the identified data source into a data format consistent with the first protocol; and communicating the transformed data to the mainframe application in response to the I/O request.

2. The method of claim 1, wherein each particular driver of the plurality of drivers includes configuration data mapping of a plurality of I/O requests of the first protocol to a plurality of corresponding capabilities of the particular driver of the plurality of drivers according to a protocol specific to the particular driver, and wherein identifying a first one of the plurality of data sources that is suitable for addressing the I/O request comprises identifying the first one of the plurality of data sources and identifying the second protocol as the protocol specific to the particular driver.

3. The method of claim 1, further comprising:
receiving a plurality of additional I/O requests pursuant to the first protocol, from the mainframe application;
for each of the additional I/O requests received pursuant to the first protocol:
automatically converting the additional I/O request from the first protocol to the second protocol;
receiving a response to the additional I/O request from the identified data source according to the second protocol;
automatically converting the response to the additional I/O request received from the identified data source from the second protocol to the first protocol.

4. The method of claim 1, wherein the security and management policies govern the operation of the mainframe application and the identified data source including determining backup policies, file size policies and encryption policies.

5. The method of claim 1, wherein the data received from the identified data source is received according to the transmission control protocol/internet protocol (TCP/IP) suite of communication protocols.

6. The method of claim 5, wherein the data received from the identified data source is received according to the iSCSI standard.

7. The method of claim 1, further comprising:
establishing a communication session between the storage client and the first one of the plurality of data sources, and a communication session between the storage client and a second one of the plurality of data sources, in parallel;
read data from the first one of the plurality of data sources and write to the second one of the plurality of data sources, while the first communication session and the second communication session are active.

8. A computer configured to access a storage device, the computer comprising:
a processor, and
a non-transitory, computer-readable storage medium storing computer-readable instructions that when executed by the processor cause the computer to perform:
receiving, at a storage client, an input/output (I/O) request from a mainframe application, the input/output (I/O) request being pursuant to a first protocol, the first protocol being a proprietary, mainframe protocol;
wherein, the storage client includes a plurality of drivers, each driver being associated with a respective one of a plurality of data sources;
identifying a first one of the plurality of data sources that is suitable for addressing the I/O request, the first one of the plurality of data sources being configured to communicate using a second protocol, the second protocol being a standards-based I/O protocol that is inconsistent with the first protocol;
accessing configuration data associated with the respective driver of the identified data source;
using the configuration data to convert the I/O request pursuant to the first protocol to a corresponding capability of the identified data source pursuant to the second protocol;
enforcing, using the storage client, security and management policies associated with the mainframe application and security and management policies associated with the identified data source;
executing the I/O request on the identified data source, using the corresponding capability pursuant to the second protocol;
receiving data from the identified data source, in response to the I/O request;
determining whether the data received from the identified data source requires transformation in order to be consistent with the first protocol;
in response to determining that the data requires transformation, transforming the data received from the identified data source into a data format consistent with the first protocol; and
communicating the transformed data to the mainframe application in response to the I/O request.

9. The computer of claim 8, wherein each particular driver of the plurality of drivers includes configuration data mapping of a plurality of I/O requests of the first protocol to a plurality of corresponding capabilities of the particular driver of the plurality of drivers according to a protocol specific to the particular driver, and wherein identifying a first one of the plurality of data sources that is suitable for addressing the I/O request comprises identifying the first one of the plurality of data sources and identifying the second protocol as the protocol specific to the particular driver.

10. The computer of claim 8, wherein the computer-readable instructions further cause the computer to perform:
receiving a plurality of additional I/O requests pursuant to the first protocol, from the mainframe application;
for each of the additional I/O requests received pursuant to the first protocol:
automatically converting the additional I/O request from the first protocol to the second protocol;
receiving a response to the additional I/O request from the identified data source according to the second protocol;
automatically converting the response to the additional I/O request received from the identified data source from the second protocol to the first protocol.

11. The computer of claim 8, wherein the security and management policies govern the operation of the mainframe application and the identified data source including determining backup policies, file size policies and encryption policies.

12. The computer of claim 8, wherein the mainframe application resides on a mainframe server comprising a z/OS server employing a virtual storage access method (VSAM).

13. The computer of claim 8, wherein the identified data source comprises a computer running either a Microsoft Windows operating system or a Linux operating system.

14. The computer of claim 8, wherein the data received from the identified data source is received according to the transmission control protocol/internet protocol (TCP/IP) suite of communication protocols.

15. The computer of claim 8, wherein the computer-readable instructions further cause the computer to perform:
establishing a communication session between the storage client and the first one of the plurality of data sources, and a communication session between the storage client and a second one of the plurality of data sources, in parallel; and read data from the first one of the plurality of data sources and write to the second one of the plurality of data sources, while the first communication session and the second communication session are active.

16. A computer program product comprising:

a non-transitory computer-readable storage medium having computer-readable program code embodied therewith, the computer-readable program code comprising:

computer-readable program code configured to receive, at a storage client, an input/output (I/O) request from a mainframe application, the input/output (I/O) request being pursuant to a first protocol, the first protocol being a proprietary, mainframe protocol;

wherein, the storage client includes a plurality of drivers, each driver being associated with a respective one of a plurality of data sources;

computer-readable program code configured to identify a first one of the plurality of data sources that is suitable for addressing the I/O request, the first one of the plurality of data sources being configured to communicate using a second protocol, the second protocol being a standards-based I/O protocol that is inconsistent with the first protocol;

computer-readable program code configured to access configuration data associated with the respective driver of the identified data source;

computer-readable program code configured to use the configuration data to convert the I/O request pursuant to the first protocol to a corresponding capability of the identified data source pursuant to the second protocol;

computer-readable program code configured to enforce, using the storage client, security and management policies associated with the mainframe application and security and management policies associated with the identified data source;

computer-readable program code configured to execute the I/O request on the identified data source, using the corresponding capability pursuant to the second protocol;

computer-readable program code configured to receive data from the identified data source, in response to the I/O request;

computer-readable program code configured to determine whether the data received from the identified data source requires transformation in order to be consistent with the first protocol;

computer-readable program code configured to, in response to determining that the data requires transformation, transform the data received from the identified data source into a data format consistent with the first protocol; and computer-readable program code configured to communicate the transformed data to the mainframe application in response to the I/O request.

* * * * *